Figure 1:
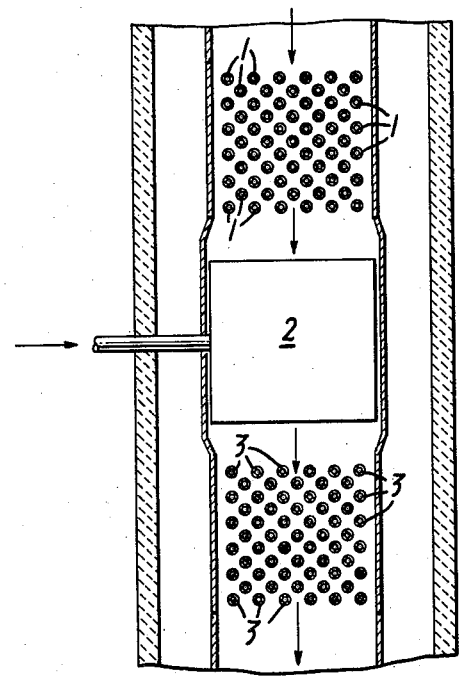

July 21, 1964   K. SERCK-HANSSEN   3,141,762
PROCESS FOR TRANSMITTING HEAT FROM HOT FINE-GRAINED
MATERIAL TO COLD FINE-GRAINED MATERIAL
Filed Dec. 29, 1961

INVENTOR.
KLAUS SERCK-HANSSEN

BY *Eyre Mann + Lucas*

ATTORNEYS

United States Patent Office 3,141,762
Patented July 21, 1964

3,141,762
PROCESS FOR TRANSMITTING HEAT FROM HOT FINE-GRAINED MATERIAL TO COLD FINE-GRAINED MATERIAL
Klaus Serck-Hanssen, Oslo, Norway, assignors, by mesne assignments, to Elektrokemisk A/S, Radhusgaten, Norway, a corporation of Norway
Filed Dec. 29, 1961, Ser. No. 163,098
Claims priority, application Norway Jan. 7, 1961
5 Claims. (Cl. 75—33)

The so-called magnetizing roasting process applied to hematite-containing iron ore consists in transforming the weakly magnetic hematite to strongly magnetic magnetite by action of a reducing agent, usually a reducing gas. The ore must during this process be heated to a temperature at which the reaction proceeds at a reasonable speed. This will in practice mean that the ore must be heated to about 600–700° C. Such heating will require about 150,000 Kcal. per ton of ore. Usually only poor iron ores will be subjected to magnetizing roasting, the roasting process being followed by a simple concentration process. An ore containing about 34% Fe as hematite will require an amount of gas corresponding to a combustion value of about 60,000 Kcal. The necessary gas volume will differ for the different gas types. The greater part of the calorie consumption in the process is spent for heating of the ore, and it is therefore of great importance for the heat economy of the process that the sensible heat of the out-going ready treated ore may be utilized for heating of in-going cold ore.

There has been proposed different kinds of equipment for magnetizing roasting which all have as their object to improve the heat economy of the process. Some of these proposals have been based on the principle of transmitting heat from the out-going ore to the in-going ore by means of circulating gases. According to other proposals the out-going ore and in-going ore have been brought to pass each other in counter-current on either side of a metallic partition wall through which the heat is transmitted. It has further been proposed to transmit the sensible heat of the out-going ore to solid bodies, preferably balls, by passing the ore and balls counter-currently through a drum. The balls are subsequently transferred to another drum in which they pass in counter-currently to the in-going ore, thereby giving off their heat to the ore.

The present invention relates to a new process for transmitting the sensible heat of the out-going ore to the in-going ore of a roasting apparatus. According to the invention the hot roasted ore is brought to pass a set of spaced hollow heating elements such as pipes in such a way that the ore will contact the outer surfaces of the pipes in which is circulated a suitable liquid medium. The ore will thereby give off a part of its sensible heat to the liquid. The amount of heat given off will depend on the surface area of the pipes. The liquid is subsequently transferred to another set of pipes in which it gives off its sensible heat to the in-going ore which pass the pipes in direct contact with their outer surface. The liquid is recirculated to the first set of pipes, and the process is repeated.

Figure 2:
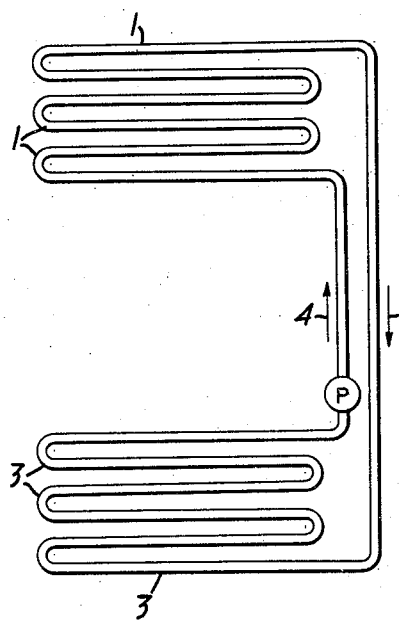

An example of an embodiment of the invention is schematically illustrated on the attached drawing, FIGS. 1 and 2.

FIG. 1 shows a vertical section through an equipment according to the invention, while FIG. 2 shows a principal arrangement of the heat transmitting pipes.

When the roaster is in operation the cold ore which is introduced from above, will pass outside the pipes 1 in direct contact with their outer surface whereby the ore is preheated by transmission of heat from the hot liquid passing inside the pipes. The preheated ore will descend into the reducing compartment 2 which is not occupied by the pipes of either pipe sets 1 or 3. Additional heat may be supplied to the ore and/or the liquid medium between the pipe sets 1 and 3.

The hot reduced ore will descend from the reduction compartment 2 into the lower part of the apparatus which contains the pipe set 3. The ore will here give off its sensible heat to the liquid which passes inside the pipes 3. The heated liquid medium is led back to the pipe set 1 in which it gives off its heat to fresh ore whereupon the cold liquid is passed on to the pipe set 3 etc.

The circulation of the liquid medium is effected by means of a pump. The liquid is circulated in the direction of the arrows 4 and 5 on FIG. 2, the heat being thus conducted in counter-current to the ore.

It may be argued against this apparatus that its heat transmitting surface must be greater than by equipments in which the out-going and in-going ore exchange their heat through a metallic partition wall. Such arguments may be based on the fact that the heat exchange according to the invention comprises transmission of heat from the ore to the liquid within the pipes through the metallic walls of the pipes, and subsequent transmission of heat from the liquid to the fresh ore through the metallic walls of another set of pipes. This is, however, not correct. The heat transmission number for ore to a metallic wall will be so low as compared to the heat transmission number for liquid to a metallic wall that the first-mentioned heat transmission number will be the important one. The apparatus will therefore operate as if the hot and cold ore were separated by only one metallic wall. By the suggested apparatus it will thus in reality be obtained a smaller heat transmission surface for the same amount of heat and the same difference between the temperatures of out-going and in-going ore than by conventional equipment. This is due to the fact that a comparatively bigger portion of the metallic partition walls will be in contact with the ore.

The suggested apparatus for heat exchange between out-going and in-going ore may be utilized in connection with different equipment in which is effected a reduction of hematite to magnetite. Up till now the equipment for such reduction of fine-grained ore has usually consisted of a drum or a fluosolid reactor in which the ore is brought into contact with reducing gases. The liquid medium which effects the heat transmission according to the invention is most easily passed from one heat exchanger to the other, and the heat exchange pipes of the invention may therefore be arranged at considerable distance from each other, f.i., in either end of a drum. The transfer of the liquid medium from one set of pipes to another will of course be much simpler than the above described transfer of solid bodies.

As heat transmitting liquids may be utilized a medium which stays liquid and has a reasonable vapour pressure within the temperature range in question. Easily fusible metals or metal alloys as for instance alloys of sodium and potassium are excellent suited for the purpose. It is also possible to utilize two or more different liquid media for different temperature zones in the heat exchanger. Such procedure will necessitate a separate circulating system for each liquid medium.

The apparatus may also be utilized in connection with other metallurgical processes in which pulverulent ore is being heated without losing its pulverulent form. The process is not limited to treatment of ores. It can also be employed in analogue way for all fine-grained non-clogging solid materials.

What I claim is:

1. Process for transmitting heat from hot fine-grained solids to colder fine-grained solids which comprises passing said colder fine-grained solids through the spaces between and in direct contact with the surfaces of the first of at least two sets of a plurality of spaced hollow heating elements, the heating elements of each of said two sets communicating both with each other and with the heating elements of the other set to form a closed system of circulation, heating said colder fine-grained solids after passage through said first set of heating elements in a space which is unoccupied by the heating elements of either of said two sets, passing the thus heated hot fine-grained solids through the spaces between and in direct contact with the surfaces of said second set of plurality of spaced hollow heating elements, and circulating a liquid heat transfer medium through the closed system formed by all of said hollow heating elements to transfer the sensible heat of said hot fine-grained solids to said colder fine-grained solids.

2. Process in accordance with claim 1 in which said liquid medium is selected from the group consisting of fusible alloys of sodium, potassium and mixtures thereof.

3. Process in accordance with claim 1 in which said hollow heating elements are maintained in stationary position.

4. Process in accordance with claim 1 in which said colder fine-grained solids comprise iron ore and in which said ore is heated in said unoccupied space in the presence of a reducing gas.

5. Process in accordance with claim 4 in which said iron ore comprises hematite which is reduced to magnetite when heated in said unoccupied space in the presence of said reducing gas.

References Cited in the file of this patent

UNITED STATES PATENTS

| | | |
|---|---|---|
| 1,846,530 | Smith | Feb. 23, 1932 |
| 1,868,512 | Ahlmann | July 26, 1932 |
| 2,036,578 | Keyes | Apr. 7, 1936 |
| 2,536,099 | Schleicher | Jan. 2, 1951 |
| 2,674,612 | Murphree | Apr. 6, 1954 |